US008805942B2

(12) United States Patent
Santos et al.

(10) Patent No.: US 8,805,942 B2
(45) Date of Patent: Aug. 12, 2014

(54) STORING AND PARTITIONING EMAIL MESSAGING DATA

(75) Inventors: Fabio Santos, Sammamish, WA (US); Gregory Gourevitch, Redmond, WA (US); Wilbert De Graaf, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 267 days.

(21) Appl. No.: 13/415,265

(22) Filed: Mar. 8, 2012

(65) Prior Publication Data

US 2013/0238718 A1 Sep. 12, 2013

(51) Int. Cl.
*G06F 15/16* (2006.01)
(52) U.S. Cl.
USPC .......................................... 709/206; 709/200
(58) Field of Classification Search
USPC .......................................... 709/206, 200, 224
IPC .................................... H04L 65/4023
See application file for complete search history.

(56) References Cited

U.S. PATENT DOCUMENTS

| 5,794,253 | A | 8/1998 | Norin et al. |
| 7,924,283 | B1 | 4/2011 | Hao et al. |
| 7,945,540 | B2 | 5/2011 | Park et al. |
| 2004/0260671 | A1 | 12/2004 | Potter et al. |
| 2006/0031357 | A1 | 2/2006 | Misra et al. |
| 2009/0198736 | A1 | 8/2009 | Shen et al. |
| 2011/0153753 | A1 | 6/2011 | Childress et al. |
| 2012/0317150 | A1* | 12/2012 | Coverston et al. ............ 707/802 |
| 2013/0117098 | A1* | 5/2013 | Madsen et al. ............. 705/14.39 |

OTHER PUBLICATIONS

Rachmiel, Andy, "Time-Based Partitioning Across Multiple Servers", Retrieved at <<http://www.providentialbusinessconsultants.com/documents/Jan_06_SupportLink_Article.pdf>>, Feb. 12, 2006, pp. 1-5.

\* cited by examiner

*Primary Examiner* — El Hadji Sall
(74) *Attorney, Agent, or Firm* — Louise Bowman; Jim Ross; Micky Minhas

(57) ABSTRACT

A system is provided for storing messaging data at a mail transport agent in a network environment. An email message may be transmitted over a network from a sender client to a recipient server through a plurality of mail transport agents (MTA). An MTA may receive an email message and may store messaging data for the email message in a data store associated with the MTA. The MTA may partition the messaging data into generations representing a defined time frame for the date and time that an email message was received. The MTA may enable a search operation to be performed on the stored generations for retrieving and replaying messaging data to a downstream recipient server. The MTA may continually clean the data store by deleting from the data store a generation of data that has expired and outlived the predefined hold period.

18 Claims, 6 Drawing Sheets

STORING AND PARTITIONING EMAIL MESSAGING DATA

BACKGROUND

In a networked environment, email may be routed from a sending client over the network to one or more destination recipient mailbox servers. Conventional email routing involves routing an email message through mail transport agents or servers using simple mail transfer protocol (SMTP). Typically, when an email message passes through a mail transport agent, data associated with the email message may be only briefly stored on the mail transport agent for a period long enough to receive the email message from the sender and to send the email message to the next server on the email transmission route.

In an email routing scenario using agent(s) without local storage of the email message data on the mail transport agent, if downstream recipient servers fail, lose, or destroy the message data, then there may be no backup copy of the email message data and the data may be permanently lost. To support high availability scenarios, backup or duplicate copies of transmitted email message data may be needed to be maintained and stored such that if data is lost, a duplicate copy may be efficiently located and provided upon a request by a recipient server within the network.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a system for storing messaging data at a mail transport agent in a network environment. An email message may be transmitted over a network from a sender client to a recipient server through a plurality of mail transport agents. A mail transport agent may receive an incoming email message and may store messaging data associated with the email message in a data store associated with the mail transport agent. The mail transport agent may partition the messaging data into generations where each generation represents a time frame for the date and time that an email message was received. The MTA may enable a downstream recipient server to request to replay messaging data and the MTA may perform a search operation on the stored generations for retrieving and replaying messaging data to the downstream recipient server. The mail transport agent may additionally continually clean up the data store by removing and deleting from the data store a generation of data that has expired and outlived the predefined hold period. The mail transport agent may be configured to scan the stored generations for unprocessed email messages, and if unprocessed email messages are identified, the mail transport agent may suspend deletion of the generation until the email message is delivered and processed by its destination recipient server.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
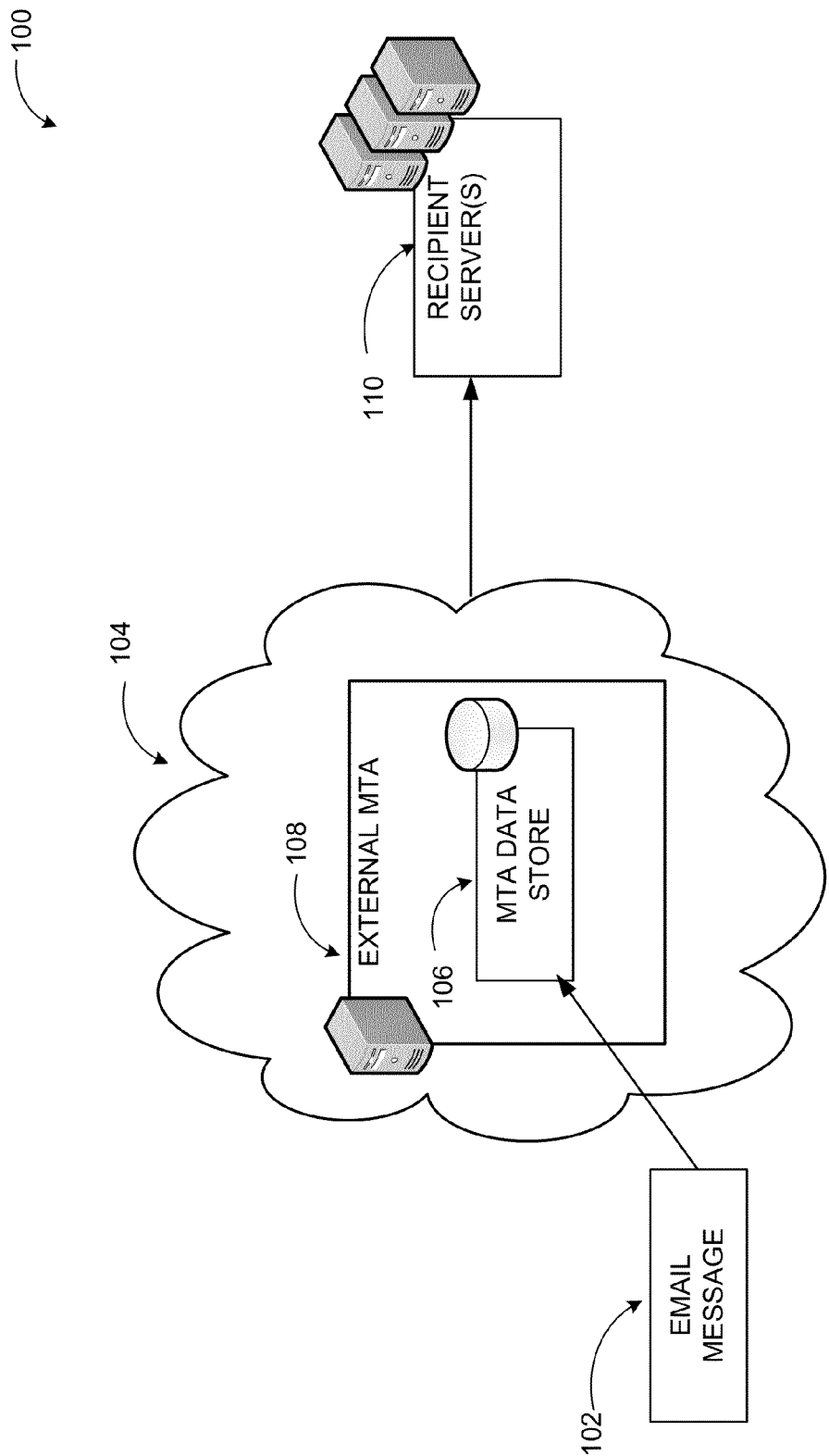
FIG. 1 illustrates a system for storing message data in a mail transport agent during email transmission, according to embodiments.

As briefly described above, a system is provided for storing messaging data at a mail transport agent in a network environment. An email message may be transmitted over a network from a sender client to a recipient server through a plurality of mail transport agents (MTA). An MTA may receive an email message and may store messaging data for the email message in a data store associated with the MTA. The MTA may partition the messaging data into generations representing a defined time frame for the date and time that an email message was received. The MTA may enable a search operation to be performed on the stored generations for retrieving and replaying messaging data to a downstream recipient server. The MTA may additionally continually clean the data store by deleting from the data store a generation of data that has expired and outlived the predefined hold period.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for storing and partitioning email message data at a mail transport agent in a networked environment. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 illustrates a system for storing message data in a mail transport agent during email transmission, according to embodiments. In a networked environment as demonstrated in diagram 100, an email message 102 may be transmitted over a network 104 to its destination at a recipient server. In a system according to embodiments, the email message 102 sent from a sender client may be received by a mail transport agent 108 (MTA) associated with a server 106 on the network 104 using Simple Mail Transfer Protocol (SMTP). The MTA 108 may be responsible for routing the incoming email message 102 from the sender client to its destination at one or more servers 110.

Typically when an email message 102 passes through a conventional MTA, it may be only briefly stored on the MTA. An MTA 108 according to embodiments may store messages for a period long enough to receive the email message from the sender and to send the email message to the next servers 110 on the email transmission route even if it is days as opposed to seconds. Since in such a scenario there is effectively no local storage of the email message data on the MTA 108, if downstream servers 110 fail or lose the data, then there may be no backup copy of the email message data, and the data may be permanently lost.

In a system according to embodiments, the MTA 108 may be configured to persist or store a local copy of transmitted email message data in a data store 106 on the MTA 108. If email message data is subsequently lost or destroyed at a downstream server, the email message data may be requested and retrieved from its storage location in the data store 106 in the MTA 108. The MTA 108 may receive email messages from a plurality of sender clients, and the MTA 108 may transmit the received email messages to many servers 110, and thus the amount of data that needs to be stored in the MTA 108 for backing up the transmitted email messages can be very large and difficult to parse. The MTA 108 may organize the email message data in the data store 106 into two database entities, a message data entity and a recipient entity. The message data entity may include data related to the email message itself and its state, such as processed, delivered, unprocessed, undeliverable etc. The recipient entity may include data related to the email message's recipients, recipients' state, and servers associated with the recipients, such that the data store may maintain a clear, organized, and searchable database of message data and recipient data during email transmission.

Figure 2:
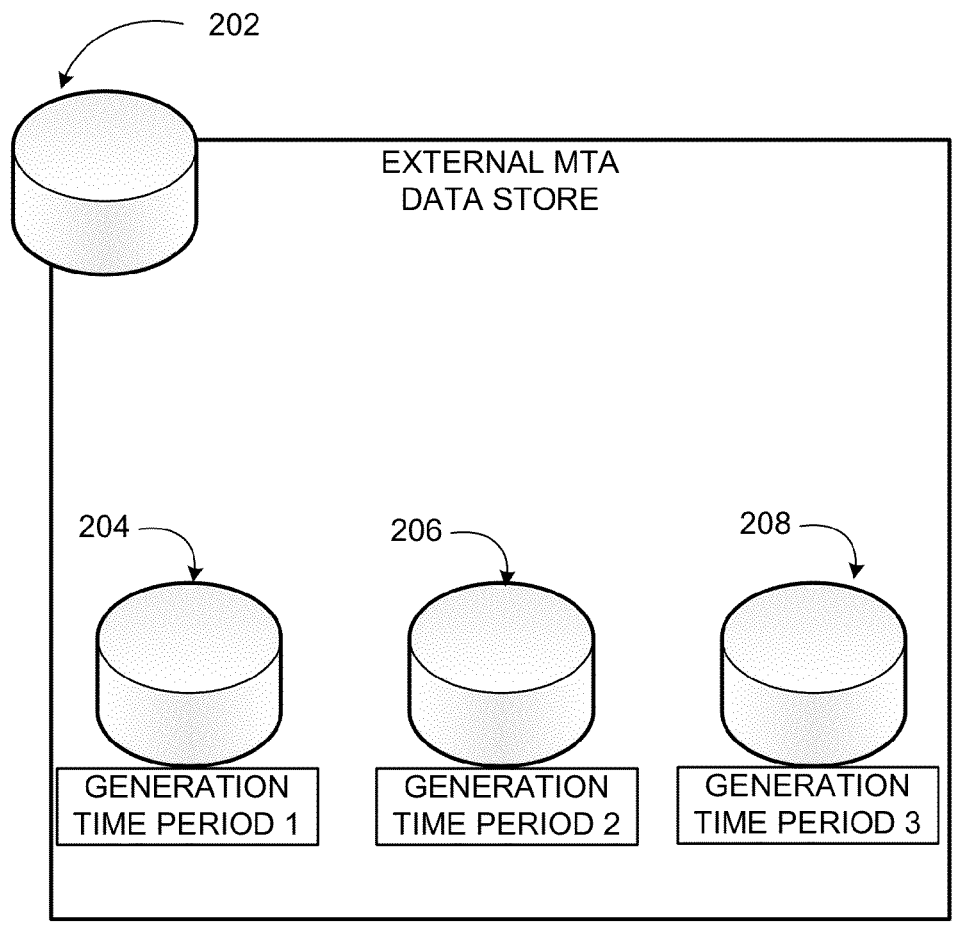
FIG. 2 illustrates an example system for partitioning data stored on a mail transport agent, according to embodiments.

FIG. 2 illustrates an example system for partitioning data stored on a mail transport agent, according to embodiments.

In a system according to embodiments, the MTA may organize the email message data stored in the data store 202 into time based partitions or generations 204, 206, 208, so that the data is more manageable by the system and more easily searchable. Time based partitioning of the message data and the recipient data may enable the system to achieve optimal data contiguity, and may additionally enable the system to perform efficient cleanup and CRUD (create, read, update, delete) operations. Further, organizing the data into time based partitions may increase the amount of data that the system can efficiently manage and may enable the system to perform efficient search.

In an example embodiment, the message and recipient data may be partitioned into generations 204, 206, 208 representing a time frame for the date and time that an email message was received at the MTA. Any email message that is received by the MTA during a particular time frame may be stored in the generation 204 representing that time frame regardless of the identity of the sender or the destination server, such that each partitioned generation may contain data for multiple email messages with multiple recipients. Partitioning the data into brief time period generations 204, 206, 208 may allow each generation to be a manageable size for the system to perform searches and normal CRUD operations on the message data and the recipient data.

The time frame for each generation may be any time frame configured by the system, such as for example, an hour, a day, or a week. The time frame can be automatically configured by the system or by a user to any optimal time frame. The generation size may not be constrained by the maximum number of records. Such a limit may be really big and practically unreachable. A limit may be a specific number of records that is not too small to lose efficiency of the internal data structures and not too big to cause the cleanup granularity to be too big. Cleanup may happen a generation at a time. Thus, if 10 days of data are held and the generation is a day long, data may be released at 10% of total database space at a time. This may necessitate larger disks then if disks for, for example, an hour generation size are used freeing up smaller chunks of data more often.

In a further embodiment, the system may be configured to enable system cleanup or data removal using the partitioned generations. The data store on the MTA may store a plurality of generations, and the system may configure the number of generations it should maintain in the data store. For example, the data store 202 may maintain generations going back one year and may delete generations for time periods older than one year. In order to achieve data contiguity, the system may delete data using the generations 204, 206, 208. Rather than simply deleting data for one or more individual email messages, the system may delete an entire generation of data at a time, thus maintaining data contiguity and freeing up a large amount of data storage with each deletion.

Data may only be eligible to be deleted from the data store 202 after it has been acknowledged as delivered and processed at a destination recipient server, and then stored for a predetermined period of time on the data store of the MTA. The predetermined period of time may be a fixed amount of time (a hold period) configured by the system and represents the minimum amount of time that data needs to remain stored within a generation on the data store of the MTA. The data deletion process may operate on a fixed schedule, such that a generation is automatically deleted at a preconfigured time. In an example embodiment, the fixed time for deletion of a generation may be a time period equal to the time frame of the generation to be deleted. For example, if each generation represents a one-hour time frame, then every hour the oldest one-hour generation may be deleted.

In a further embodiment, the data deletion process may include a cleanup process and an expiry process. The cleanup process may automatically operate on every generation whose age is equal to or older than the hold period. For example, if the hold period is one hour, then any generation whose age is one hour or older may undergo the cleanup process. During the cleanup process, the system may scan the data included in a generation eligible for deletion for any undelivered and/or unprocessed email messages, as well as delivered messages which may not have elapsed for the hold period. If the system identifies any undelivered and/or unprocessed email messages or delivered messages that have not elapsed the full hold period, then the data for those identified results may be cached, and the system may suspend deletion of the generation until the email message is processed at its destination server. If the system does not identify any undelivered and/or unprocessed email messages or delivered messages that have not elapsed the full hold period, then the generation may be deleted, making that storage space available for new a new generation of data.

The expiry process may operate to delete message data in a generation at a generation expiry date, which may be the hold period plus a message expiration date. Each message may have a preconfigured expiration time, at which the message is assumed to have been delivered and processed. During a data removal expiry process, the system does not identify undelivered or unprocessed email message, but automatically deletes a generation of data at the generation's expiry date, and freeing up that storage space for new generation of data.

Figure 3:
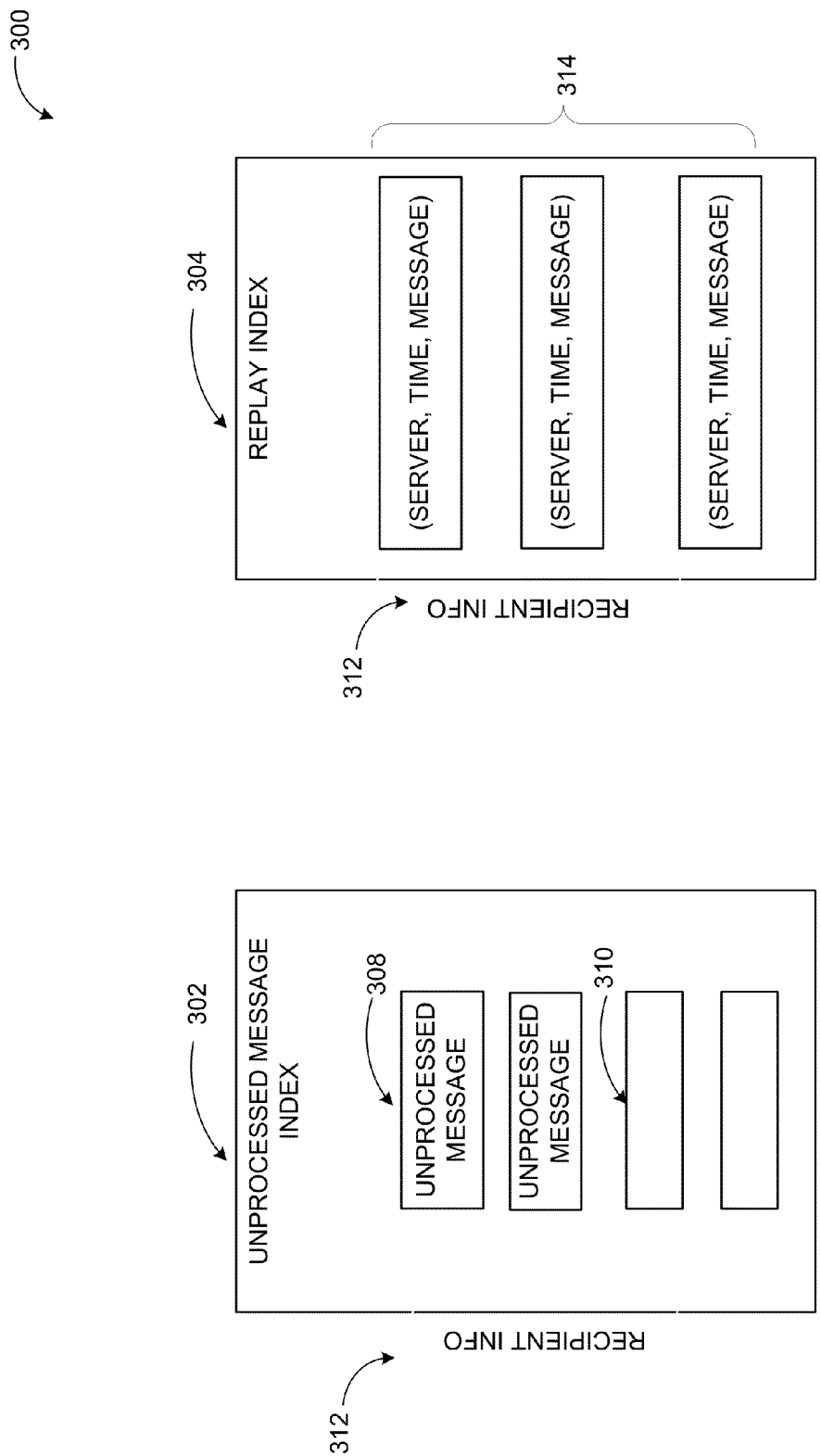
FIG. 3 illustrates an example system for searching message data stored on a mail transport agent, according to embodiments.

FIG. 3 illustrates an example system for searching message data stored on a mail transport agent in diagram 300. As previously discussed in conjunction with FIG. 1, the MTA may organize the email message data stored in the data store into time based partitions, so that the data is more manageable by the system and more easily searchable. Further, organizing the data into time based partitions may increase the amount of data that the system can efficiently manage and may enable the system to perform efficient searches for requested data. In an example scenario, a downstream server may lose or destroy email message data, and may request to reclaim that email message data from the MTA. The MTA needs to be able to efficiently search for and retrieve the requested message data from the data store.

In an example embodiment, the system may perform a search operation, such as an unprocessed message search operation, upon startup, during which the system searches for unprocessed and/or undelivered messages stored within existing generations on the data store. The unprocessed message search operation may also be performed during the cleanup process when the system scans a generation eligible for deletion for undelivered and unprocessed messages. The unprocessed message search operation may enable an efficient mechanism to quickly locate unprocessed messages within the data store on the MTA.

To facilitate the unprocessed message search operation, within each generation the data store may include an unprocessed message sparse index 302 for the message data and the recipient data. The unprocessed message sparse index 302 may be at the recipient table and may contain entries only for unprocessed messages 308 associated with one or more recipient servers 312 in order to preserve data space and may contain null entries 310 for delivered and processed messages. For example, when a message is sent, an entry may be created in the unprocessed message spare index for the message and recipient entities, and when the message is delivered and processed, the entry may be removed from the unprocessed message sparse index so that only entries exist for unprocessed messages 308. In an example embodiment, the unprocessed message search operation may operate by initially accessing a generation, opening the unprocessed message sparse index 302 for each recipient, and scanning the sparse index for entries representing unprocessed messages 308. When an entry for unprocessed message is located, the system may load the message associated with the entry, and using a boot loader, may load the undelivered recipients associated with the message, and may submit the message to the MTA to be redelivered to the recipient(s).

In a further embodiment, a replay search operation may provide back-up protection for a downstream server. The replay search operation may be performed upon a request by the downstream server to resend message data which may have been lost or destroyed by the downstream server. During the replay search operation, the downstream server may issue a replay request to the MTA which may execute the replay search operation to retrieve the original data from the data store. To facilitate the replay search operation, the data store may include a replay sparse index 304 for the message data and the recipient data within each generation. The replay sparse index 304 may be a recipient table and may include entries displaying hash code 314 for the destination server which may include where the message was delivered, date and time information when the email message was delivered, and a reference to the message. The hash code 314 for the destination and date and time information may be small in size to conserve data space in the data store of the MTA. In an embodiment, the recipient table may only store the hash code 314 data for destination and date and time information for specific destination servers which have requested the replay backup protection by the MTA in order to save data space on the data store.

An example replay search operation may be performed upon a replay query by a downstream server to request data to be replayed by first selecting a group of generations that might contain the requested data based on the time frame of the original delivery as specified in the replay query by the downstream server. The system may open the replay sparse index 304 and filter the viewable results by the destination server identity and the timeframe of original delivery of the requested data. The system may store the filtered results from the replay sparse index 304 into a separate memory structure, ordering the results by message date, and may group all of the messages during the request time frame into message/recipient reference groupings. From the reference groupings, the system may load the original message and return it to a replay component for replaying the original message to the recipient downstream server. If multiple time frames, and consequently generations, are requested for replay, the system may retrieve and replay the requested data from one generation and when the replay from the first generation is completed, the system may repeat the process for retrieving and replaying data from additional generations.

The example systems in FIG. 1 through 3 have been described with specific configurations, applications, and interactions. Embodiments are not limited to systems according to these examples. A system for storing and partitioning email message data at a mail transport agent in a networked environment may be implemented in configurations employing fewer or additional components and performing other tasks. Furthermore, specific protocols and/or interfaces may be implemented in a similar manner using the principles described herein.

Figure 4:
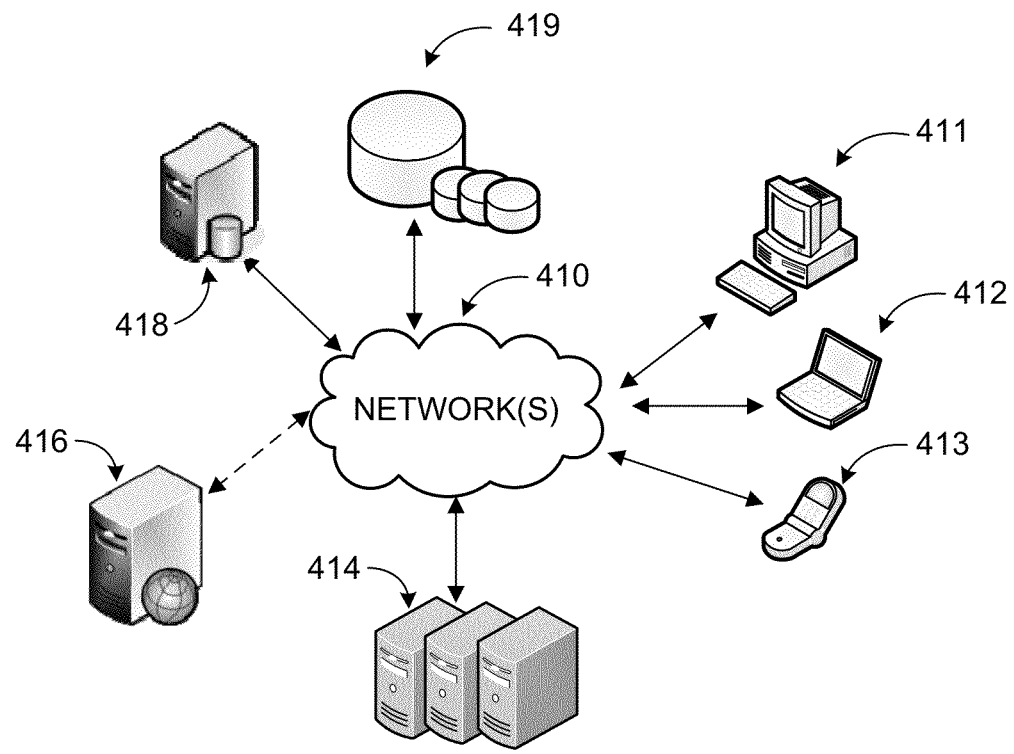
FIG. 4 is a networked environment, where a system according to embodiments may be implemented.

FIG. 4 is an example networked environment, where embodiments may be implemented. A system for storing and partitioning email message data at a mail transport agent in a networked environment may be implemented via software executed over one or more servers 414 such as a hosted service. The platform may communicate with client applications on individual computing devices such as a smart phone 413, a laptop computer 412, or desktop computer 411 ('client devices') through network(s) 410.

Client applications executed on any of the client devices 411-413 may facilitate communications via application(s) executed by servers 414, or on individual server 416. An application executed on one of the servers may storing and partitioning email message data at a mail transport agent in a networked environment The application may retrieve relevant data from data store(s) 419 directly or through database server 418, and provide requested services (e.g. document editing) to the user(s) through client devices 411-413.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a platform for storing and partitioning email message data at a mail transport agent in a networked environment. Furthermore, the networked environments discussed in FIG. 4 are for illustration purposes only. Embodiments are not limited to the example applications, modules, or processes.

Figure 5:
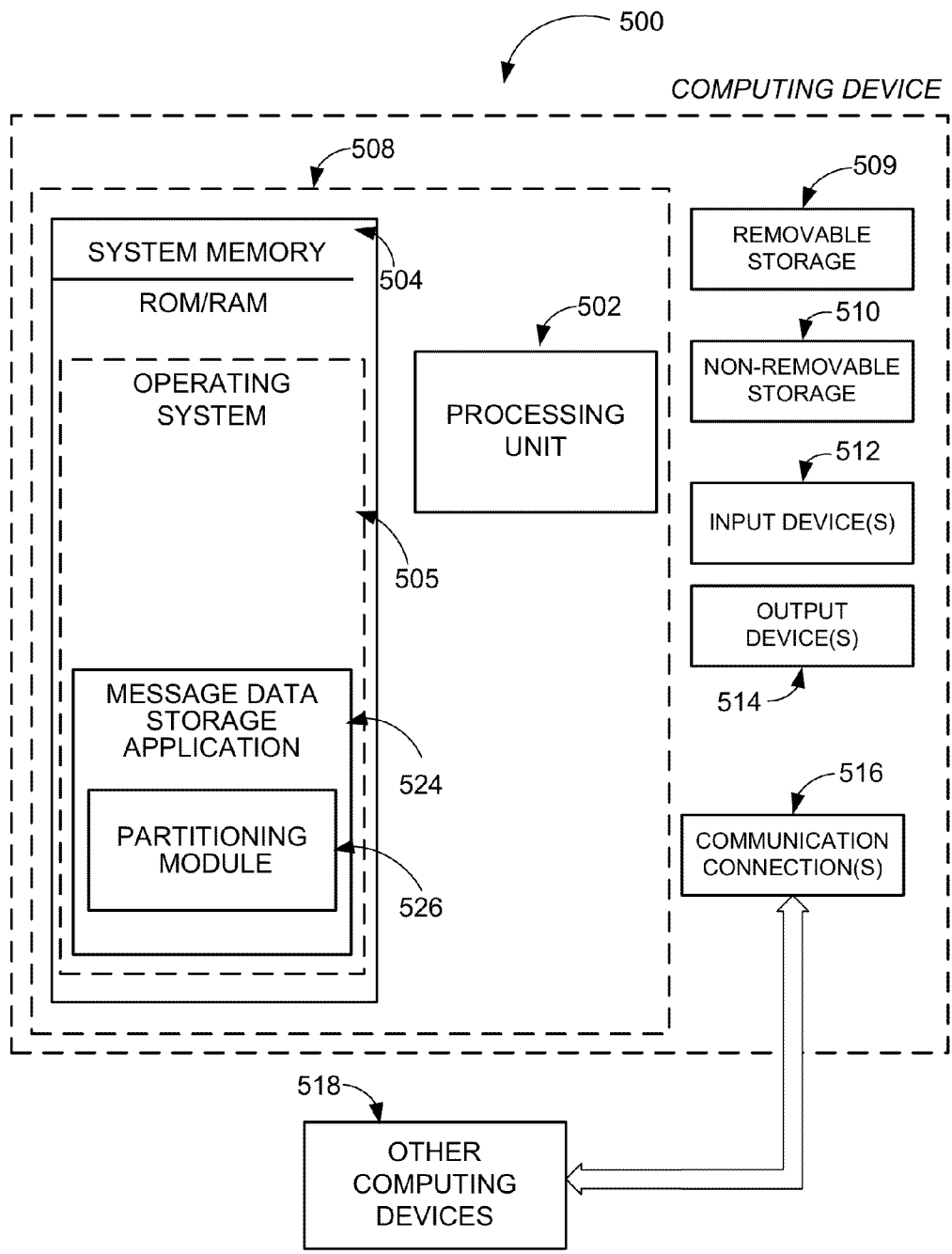
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any computing device executing an application for storing and partitioning email message data at a mail transport agent in a networked environment according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as a message data storage application 524 and a partitioning module 526.

The message data storage application 524 may facilitate storing email message data and recipient data on a data store associated with a mail transport agent in a networked environment. Message data storage application 524 may enable a computing device 500 to continually receive email messages and to store message data including message state and recipient data and state data on a data store associated with the mail transport agent for providing a backup storage of email messages transmitted to destination servers over the networked environment. Through the partitioning module 526, message data storage application 524 may partition the stored message and recipient data into time based generations representing preconfigured time frames for making the data more manageable and efficiently searchable. Message data storage application 524 and partitioning module 526 may be separate applications or integrated modules of a hosted service. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, gesture capture device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, web servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
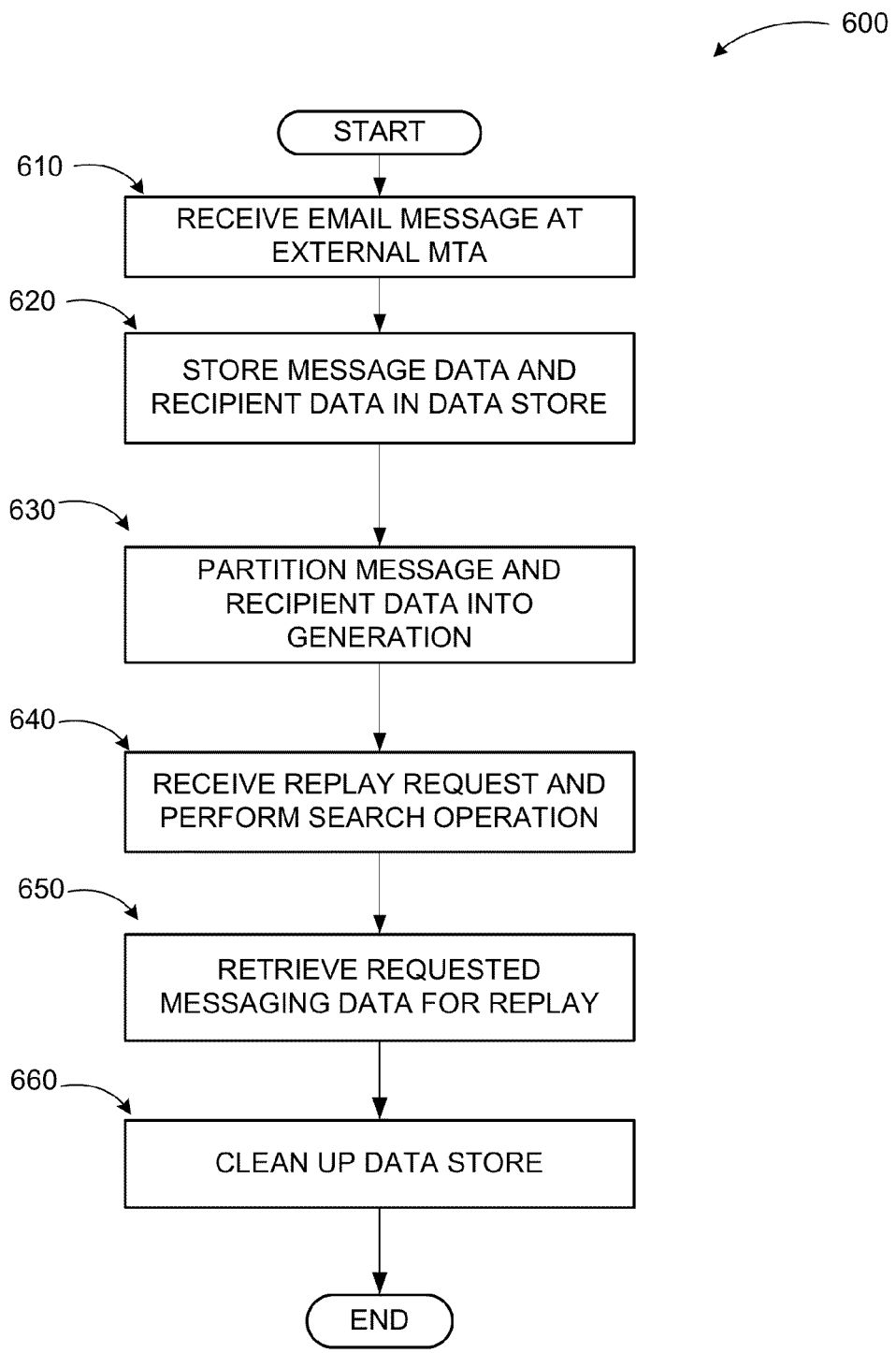
FIG. 6 illustrates a logic flow diagram for process 600 of storing and partitioning email message data at a mail transport agent in a networked environment to embodiments.

FIG. 6 illustrates a logic flow diagram for process 600 of storing and partitioning email message data at a mail transport agent in a networked environment to embodiments. Process 600 may be implemented on a computing device or similar electronic device capable of executing instructions through a processor.

Process 600 begins with operation 610, where the system may receive an email message at a mail transfer agent (MTA) hosted on a network. The email message data may be received using SMTP commands. At operation 620, the MTA may store the message data and recipient data contained in the email message in a data store associated with the MTA. At operation 630, the MTA may partition the message data and recipient data into time based generations, such that each generation may represent a time frame for the date and time that the email message was received at the MTA.

At operation 640, the MTA may, upon a request by a recipient downstream server to retrieve and replay requested data, perform a search operation to locate the requested data in a partitioned generation within the data store. At operation 650, the MTA may retrieve the requested data and may replay the requested data to the requesting downstream server. At operation 660, the MTA may continually clean up the data store by removing and deleting from the data store a generation of data that has expired and outlived the predefined hold period.

The operations included in process 600 are for illustration purposes. Storing and partitioning email message data at mail transport agent in a networked environment may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for storing messaging data at a mail transport agent in a network environment, the method comprising:
   receiving an email message at a mail transport agent (MTA);
   retrieving messaging data associated with the email message, wherein the messaging data includes at least one from a set of: data associated with the email message, data associated with a state of the email message, and data associated with one or more recipients of the email message;
   storing the messaging data in a data store associated with the mail transport agent as one or more generations representing configurable time based partitions;
   scanning the one or more generations for one or more unprocessed email messages; and
   if one or more unprocessed emails are identified, caching the messaging data for the one or more unprocessed email messages and suspending an automatic deletion of the one or more generations.

2. The method of claim 1, further comprising:
   storing messaging data for a plurality of email messages having a plurality of recipients received by the MTA in the generations.

3. The method of claim 1, further comprising:
   enabling the MTA to configure a time frame for the generations based on a date and a time of receipt of the email message at the MTA.

4. The method of claim 3, further comprising:
   automatically configuring the time frame for the generations based on the date and time of the receipt of the email message at the MTA.

5. The method of claim 3, further comprising:
   defining a maximum time size of the generations.

6. The method of claim 5, further comprising:
   configuring a maximum time size of email messages and messaging data that can be stored in the generations.

7. The method of claim 6, further comprising:
   configuring the time frame for the generations based on at least one from a set of: the maximum time size of email messages and messaging data stored in the generation and the maximum time size of the generation.

8. The method of claim 1, further comprising:
   deleting data from the data store by removing an entire generation storing messaging data from the data store.

9. The method of claim 8, further comprising:
   automatically deleting the generation after a predetermined period of time.

10. The method of claim 9, further comprising:
    automatically deleting a plurality of generations sequentially at predefined time periods, wherein the predefined time periods equal a time frame of the generations to be deleted.

11. A computing device for storing messaging data at a mail transport agent in a network environment, comprising:
    a memory storing instructions;
    a processor coupled to the memory, the processor executing a storage and partitioning application, wherein the storage and partitioning application is configured to:
    receive an email message at a mail transport agent (MTA);
    retrieve messaging data associated with the email message, the messaging data including at least one from a set of: data associated with the email message, data associated with a state of the email message, and data associated with one or more recipients of the email message;
    partition the messaging data into one or more generations representing a time frame based on a date and a time of receipt of the email message at the MTA;
    store the one or more generations in a data store associated with the MTA;
    upon expiration of a time period sufficient to process delivery requests for a plurality of email messages associated with a generation, scan the generation for unprocessed messages;
    if no unprocessed message is found, automatically delete the generation; and
    if one or more unprocessed email messages are found, cache the messaging data for the one or more unprocessed email messages and suspend deletion of the generation.

12. The computing device of claim 11, wherein the storage and partitioning application is further configured to:
    receive a request from a downstream recipient server to retrieve and replay messaging data for a previously sent email message; and perform a search operation across the one or more generations to locate and retrieve the requested messaging data.

13. The computing device of claim 12, wherein the storage and partitioning application is further configured to:
    perform an unprocessed message search operation upon startup to locate one or more unprocessed email messages stored in the one or more generations stored in the data store of the MTA;
    retrieve the messaging data for the one or more unprocessed email messages; and
    submit one or more email messages to the MTA to be re-delivered to one or more recipients designated by the messaging data.

14. The computing device claim 13, wherein the storage and partitioning application is further configured to:
    store an index of the messaging data in the data store, wherein the index includes one or more entries for the one or more unprocessed email messages; and
    enable the search operation to scan the index of messaging data to locate and retrieve the one or more unprocessed email messages by identifying the one or more entries.

15. The computing device of claim 12, wherein the storage and partitioning application is further configured to:
    perform a replay search operation upon receiving the request;
    retrieve messaging data for the previously sent email message; and
    submit the messaging data for the previously sent email message to a replay component associated with the MTA for replaying the previously sent email message to the downstream recipient server.

16. The computing device of claim 15, wherein the storage and partitioning application is further configured to:
    store a replay index of the messaging data in the data store, wherein the replay index includes hash code for one or more of: destination information of the downstream server where the previously sent email message was originally delivered, time and date information for the original delivery of the previously sent email message, and a reference to the previously sent email message; and
    enable the search operation to filter the replay index to view messaging data results based on the destination information and the time and date information of the previously sent email message.

17. A computer-readable memory device with instructions stored thereon for storing messaging data at a mail transport agent in a network environment, the instructions comprising:
    receiving an email message at a mail transport agent (MTA);
    retrieving messaging data associated with the email message;
    partitioning messaging data for a plurality of email messages having a plurality of recipients received by the MTA into one or more generations representing a time frame based on a date and a time of receipt of each email message at the MTA, the messaging data including message data and recipient data;
    storing the generations in a data store associated with the MTA;
    receiving a request from a downstream recipient server to retrieve and replay messaging data for a previously sent email message during a specified time frame;
    performing a search operation to locate and retrieve the requested messaging data employing a replay index;
    automatically deleting data from the data store by removing an entire generation storing messaging data after the generation has stored the messaging data for a predetermined period of time;
    prior to removing the entire generation, scanning the generation for one or more unprocessed email messages; and
    if one or more unprocessed emails are identified, caching the messaging data for the one or more unprocessed email messages and suspending removal of the generation.

18. The computer-readable memory device of claim 17, wherein the instructions further comprise:
    if the downstream recipient server requests to retrieve and replay messaging data for two or more time frames, beginning to retrieve and replay the requested messaging data from a first generation representing a first time frame; and
    when the replay from the first generation is completed, retrieving and replaying the messaging data from one or more subsequent generations representing additional time frames.

* * * * *